United States Patent [19]  [11] Patent Number: 4,847,354
Keil et al.  [45] Date of Patent: Jul. 11, 1989

[54] SHAPED STRUCTURE OF AROMATIC COPOLYAMIDE FROM AROMATIC DIAMINE-MIXTURE

[75] Inventors: Günter Keil; Franz Jakob, both of Hofheim am Taunus; Klaus Warning, Eppstein/Taunus; Friedrich Herold, Hofheim am Taunus, all of Fed. Rep. of Germany

[73] Assignee: Hoechst Aktiengesellschaft, Frankfurt am Main, Fed. Rep. of Germany

[21] Appl. No.: 841,842

[22] Filed: Mar. 20, 1986

[30] Foreign Application Priority Data

Mar. 23, 1985 [DE] Fed. Rep. of Germany ....... 3510655
Feb. 20, 1986 [DE] Fed. Rep. of Germany ....... 3605394

[51] Int. Cl.⁴ .............................................. C08G 69/32
[52] U.S. Cl. ................................... 528/340; 528/183; 528/185; 528/348
[58] Field of Search ................ 528/340, 348, 183, 185

[56] References Cited

U.S. PATENT DOCUMENTS 3,505,288  4/1970  Bodesheim et al. ............... 260/47
3,671,542  6/1972  Kwolek ........................ 260/30.8 R
3,767,756 10/1973  Blades ......................... 264/184
3,801,545  4/1974  Kunzel et al. .................. 260/47 CZ
4,355,151 10/1982  Shimada et al. .................. 528/340
4,382,138  5/1983  Paschke et al. .................. 528/340

Primary Examiner—Harold D. Anderson

[57] ABSTRACT

The invention relates to filaments, fibers, pulps, films and sheets from a copolyamide which has at least the recurring structural units of the formulae

A  —OC—AR—CO—

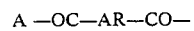

B  —NH—Ar'—NH—

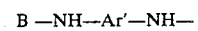

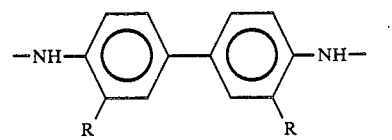

C

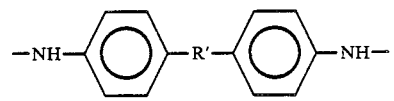

D and in which the diamine components B, C and D relative to the total amount of diamine components in mol-% are within a predetermined domain. Such copolyamides can be produced from the corresponding diamines and dicarbonyl dichlorides in aprotic solvents in the presence or absence of metal halides of the first or second group of the periodic table. The spinning solutions obtainable therein can be processed in conventional manner into the claimed shaped structures.

24 Claims, 2 Drawing Sheets

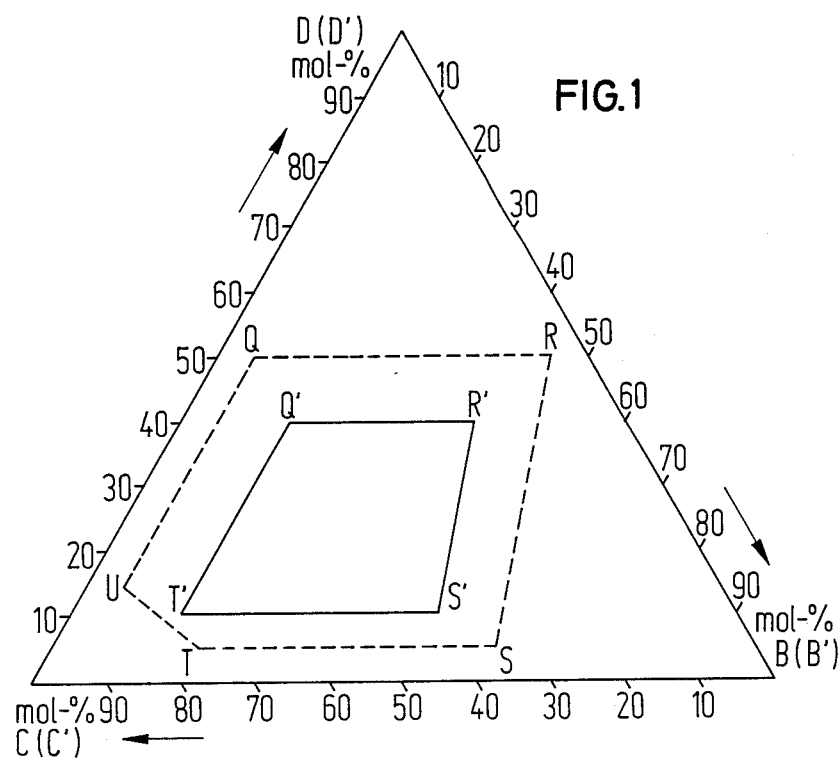

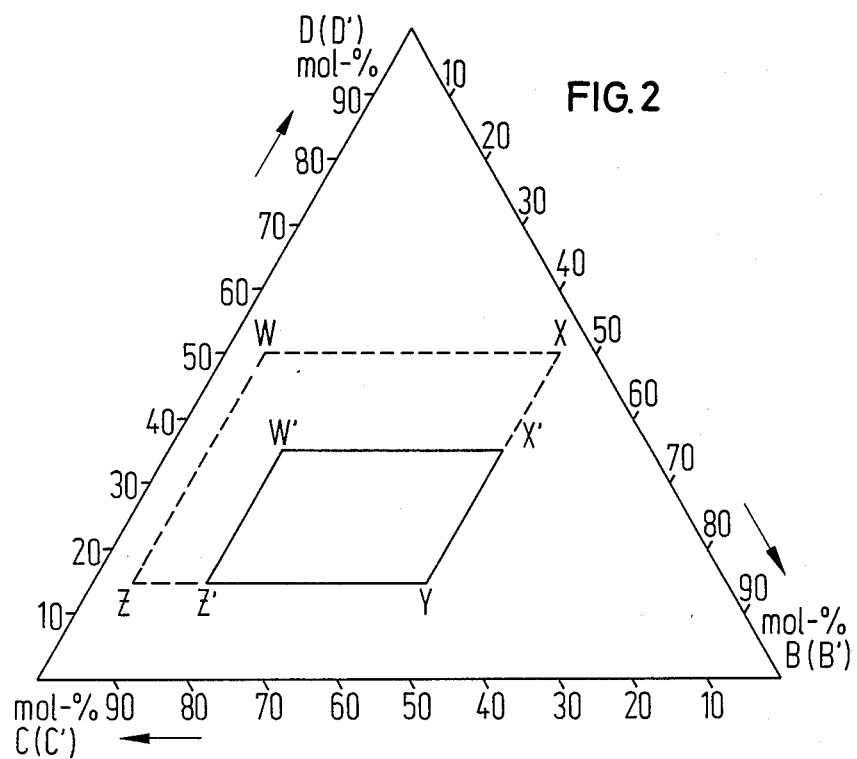

SHAPED STRUCTURE OF AROMATIC COPOLYAMIDE FROM AROMATIC DIAMINE MIXTURE

The invention relates to new shaped structures such as filaments, fibers, fiber pulp, films and sheets in aromatic copolyamides of the dicarboxylic acid/diamine type and to a process for their preparation.

Aromatic polyamides (polyaramides) are, as we know, raw materials of high thermal and chemical stability and of low flammability. For instance, fibers and films in such raw materials have very good mechanical properties, such as high strength and high initial modulus (Young modulus), and are highly suitable for industrial uses, for example for reinforcing plastics materials or as filter materials.

The preparation of the polymers required therefore is best effected in conventional manner by reacting aromatic diamines with aromatic dicarbonyl dichlorides in aprotic organic solvents of the amide type (N,N-dimethylacetamide, N-methylpyrrolidone, N,N,N',N'-tetramethylurea and the like) in the presence or absence of calcium or lithium halides, and neutralizing the resultant hydrogen chloride (for example with calcium oxide).

Polyaramide filaments having high strength and high initial modulus are those in which the amide bonds are oriented coaxially or virtually parallel to one another, thereby forming rigid, rodlike polymer molecules. Typical polyamide fibers of this type are made for example of poly(p-phenyleneterephthalamide). Such filaments are described for example in German Patent 2,219,703.

This product has a number of virtues, but the preparation of the required polyamide and its processing are very difficult. For instance, owing to the poor solubility in polar organic solvents even in the presence of inorganic salts such as calcium chloride or lithium chloride as solubilizers this polymer precipitates from the reaction medium a short time after it has been formed therein. It needs to be isolated, washed, dried and then redissolved in a spinning solvent. The preferred solvent for preparing the spinning solutions is concentrated sulfuric acid, which causes special problems in handling (safety, corrosion) and waste disposal.

Attempts have therefore been made to bypass these difficulties by developing copolyamides which are highly soluble in the known amide solvents; which also have good spinning properties; and the filaments of which are distinguished after substantial stretching by high strength values and initial moduli.

For instance, DE-A-2,144,126 describes the preparation of soluble aromatic polyamides having a high modulus of elasticity, wherein substituted 3-(p-aminophenoxy)-4-aminobenzanilides combined with terephthaloyl chloride to provide highly soluble polyamides which can be spun and stretched to give filaments of high strengths and initial moduli.

The increased solubility here is caused by the metaorientation and the oxygen bridge atom. German Patent 2,556,883 and German Offenlegungsschrift 3,007,063 describe copolyamides of terephthalic acid, p-phenylenediamine and 3,4'-diaminodiphenyl ether which, in amide solvents, give isotropic solutions which are readily spinnable. The filaments obtain high strengths and moduli by a very high stretch. The abovementioned processes have the disadvantage that the various amines required can be prepared and purified only in very expensive processes.

The present invention therefore has for its object to find such aromatic copolyamides as can be transformed by the use of amide solvents into shaped structures which are then distinguished by a number of physical properties.

In the case of the preparation of filaments and fibers, appropriate stretching processes are to produce in particular high strengths and very high initial moduli. The monomers required for the preparation of the copolyamides shall be readily available, and the polymer solutions obtained by the polycondensation shall be directly spinnable or shapable after a filtration process and an appropriate deaeration.

It has been found that this object is achieved with novel aromatic copolyamides which can be processed from solutions in aprotic solvents into shaped structures such as filaments, fibers, fiber pulp, sheets and also films. The copolyamides required for that purpose have at least the following recurring structural units:

as well as

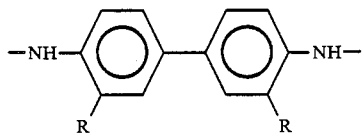

and

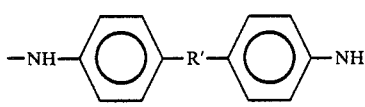

where
Ar— and —Ar'— denote divalent aromatic radicals in which the valence bonds are in para- or comparable coaxial or parallel position,
R denotes a lower alkyl radical or a lower alkoxy radical having in each case up to 4 carbon atoms or denotes a halogen radical and
—R'— denotes an unsubstituted or substituted methylene radical or a grouping —O—Ar—O— in which —Ar— has the same structure as specified above.

Thus, according to the invention, three diamine components are neessary to form the copolyamide in which the chain valence bonds on the individual benzene rings are in each case to be only in para-position or corresponding coaxial or parallel position. The amounts of the diamines used are not freely variable but only within certain mole percent ranges, based on the total number of moles of diamine components. The concentration range required according to the invention is defined by the corner points below; the bounding of the area has also been depicted in graph form in the accompanying figures in a triangular coordinate system. The corner points of the claimed range have the following coordinates:

point Q corresponds to 5 mol-% of B, 45 mol-% of C, 50 mol-% of D;

point R corresponds to 45 mol-% of B, 5 mol-% of C, 50 mol-% of D;
point S corresponds to 60 mol-% of B, 35 mol-% of C, 5 mol-% of D;
point T corresponds to 20 mol-% of B, 75 mol-% of C, 5 mol-% of D;
point U corresponds to 5 mol-% of B, 80 mol-% of C, 15 mol-% of D.

Preference is given to a range having the following corner points:
point Q'0 corresponds to 15 mol-% of B, 45 mol-% of C, 40 mol-% of D;
point R' corresponds to 40 mol-% of B, 20 mol-% of C, 40 mol-% of D;
point S' corresponds to 50 mol-% of B, 40 mol-% of C, 10 mol-% of D;
point T' corresponds to 15 mol-% of B, 75 mol-% of C, 10 mol-% of D.

These ranges are reproduced in FIG. 1. Particular preference is given to the ranges having the corner points defined hereafter. They are depicted in graph form in FIG. 2.
Point W corresponds to 5 mol-% of B, 45 mol-% of C, 50 mol-% of D;
point X corresponds to 45 mol-% of B, 5 mol-% of C, 50 mol-% of D;
point Y corresponds to 45 mol-% of B, 40 mol-% of C, 15 mol-% of D;
point Z corresponds to 5 mol-% of B; 80 mol-% of C, 15 mol-% of D.

Shaped structures in aromatic copolyamides in accordance with the present invention are obtained with excellent properties in particular when the individual portions of the diamine components are relative to the total amount of the diamine components in mol-% within a narrower range which is defined by the following corner points.
Point W' corresponds to 15 mol-% of B, 50 mol-% of C, 35 mol-% of D;
Point X' corresponds to 45 mol-% of B, 20 mol-% of C, 35 mol-% of D;
Point Y corresponds to 45 mol-% of B, 40 mol-% of C, 15 mol-% of D;
Point Z' corresponds to 15 mol-% of B, 70 mol-% of C, 15 mol-% of D.

Again this narrower range is depicted in the figure in triangular coordinates.

The intrinsic viscosity of the shape-forming copolyamides is to be between 2.4 and 6.5 ml/g. The preferred upper limit for the viscosity is 5.0 ml/g. It was determined at 25° C. on solutions of in each case 0.5 g of polymer in 100 ml of 98% by weight strength sulfuric acid.

For the purposes of the present invention, intrinsic viscosity is defined by the expression $$\eta \text{ intrinsic} = \frac{\ln \eta_{rel}}{c}.$$

where $\eta_{rel}$ is the relative viscosity and c the concentration in g/ml.

The excellent properties of the shaped structures according to the invention are due to the incorporation of the amine units B, C and D within the specified limits. Aromatic polyamides having individual ones of amine components B, C or D are common knowledge. They have no surprising properties, as is evident from the documents mentioned hereinafter and the comparative experiments which have been conducted.

For instance, the use of amine component B, i.e. for example p-phenylenediamine, is largely known and described for example in the abovementioned German Patent 2,219,703. As already stated above, polyamides which have only this amine unit together with an aromatic dicarboxylic acid radical are practically no longer soluble in aprotic solvents of the amide type. However, a spinning solution can be obtained using concentrated sulfuric acid (DE-A-1,929,713).

The same prior art also reveals the suitability of benzidines for use as aromatic polyamide component. A spinning solution is possible using fuming sulfuric acid.

The use of amine components of structure D for preparing polyamides has likewise been repeatedly described. Diamine components having a substituted or unsubstituted methylene bridge are already mentioned in DE-C-2,219,703. The use of aromatic diamines having two ether groups is likewise already known, for example from DE-A-1,595,681. The preparation of diamines having two ether groups is also described for example in Liebigs Ann. Chem. 740 (1970), 169 following. As the stated documents and in particular the comparative experiments which have been conducted reveal, if the polyamides in question are spun into filaments from organic solutions these filaments have without exception only moderate properties, while filaments from copolyamides prepared in accordance with the present invention using mixtures of amine components B+C+D in certain proportions are surprisingly distinguished by high strength and high initial modulus.

The preparation of the copolyamides required according to the invention can be effected with the following suitable compounds:
Suitable dicarboxylic acid derivatives of the formula

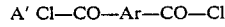

A'   Cl—CO—Ar—CO—Cl are for example 4,4'-diphenylsulfonyldicarbonyl dichloride, 4,4'-diphenyloxydicarbonyl dichloride, 4,4'-diphenyldicarbonyl dichloride, 2,6-naphthalenedicarbonyl dichloride, but in particular terephthaloyl dichloride.

A suitable aromatic diamine of the structure

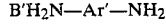

B'H₂N—Ar'—NH₂ is in particular p-phenylenediamine.

Suitable benzidine derivatives C' of the formula

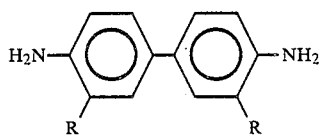

are in particular 3,3'-dimethoxybenzidine, 3,3-dichlorobenzidine and especially 3,3'-dimethylbenzidine.

The diamine component D' of the formula

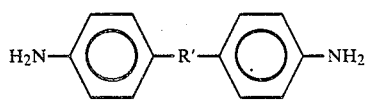

can be in particular 4,4'-diaminodiphenylmethane, 2,2-bis(phenoxy)-benzene.

The solution condensation of the aromatic dicarbonyl dichlorides with the mixtures of aromatic diamines is effected in aprotic, polar solvents of the amide type, such as, for example, N,N-dimethylacetamide or in particular N-methyl-2-pyrrolidone. Where appropriate these solvents can be admixed in conventional manner to increase the dissolving power and to stabilize the polyamide solutions with halide salts of the first and second group of the periodic table. Preferred additives are calcium chloride and/or lithium chloride.

The polycondensation temperatures are customarily between $-20°$ C. and $+120°$ C., preferably between $+10°$ C. and $+100°$ C. Particularly good results are obtained at reaction temperatures between $+10°$ C. and $+80°$ C. The polycondensation reactions are preferably carried out in such a way that after discontinuation of the reaction 2 to 15, preferably 3.5 to 10, % by weight of polycondensate are present in the solution. When the proportion of compound "D" approaches 10%, the polymer concentration in the solution needs to be reduced significantly.

The polycondensation can be stopped in a conventional manner for example by addition of monofunctional compounds, such as, for example, benzoyl chloride.

After completion of the polycondensation, i.e. when the polymer solution has reached the viscosity required for further processing, the hydrogen chloride which has formed and is loosely bonded to the amide solvent is neutralized by addition of basic substances. Suitable for this purpose are for example lithium hydroxide, calcium hydroxide, but in particular calcium oxide. To prepare shaped structures in accordance with the present invention, the abovedescribed polyamide solutions according to the invention are filtered, degassed and processed in conventional (not claimed herein) manner into filaments, fibers, fiber pulp, films or even sheets. This can be effected for example by using a wet spinning unit, where the polymer solution is forced through suitable nozzles into a coagulation bath and the resulting filaments are passed through washing baths and are stretched at elevated temperature. Suitable coagulation baths are aqueous solutions of the same amide solvent as also used for preparing the polymer. However, it is also possible to use aqueous salt solutions such as for example calcium chloride solutions.

In the preparation of filaments and fibers and also of sheets the total stretch is the combined result of a small wet stretch and a higher contact stretch. To effect the contact stretch the filaments are drawn for example across hot plates which have surface temperatures of 280° C. to 450° C., preferably 320° C. to 420° C., and in the course of that passage are stretched in a ratio of 1:5 to about 1:20, preferably 1:8 to 1:15. Where the "D" content is below 20%, stretching ratios of 1:2 or more, preferably 1:4 to 1:7, are sufficient.

A similarly suitable variant of the spinning process is the so-called "dry nozzle wet spinning process", as described for example in U.S. Pat. No. 3,414,645. There the direction of spinning is downward, and after leaving the nozzle the spun filaments first pass through a gaseous medium, preferably air, and then enter an aqueous coagulation bath. The further treatment of the filaments thus produced is effected as described above. The shaped structures prepared from the raw materials according to the invention, such as, for example, fibers, filaments, fiber pulp or sheets, serve for example as reinforcing materials for plastics and/or as industrial materials for filtration and insulation. For insulation purposes it is also possible to apply a polymer solution to another structure in the form of a film and then to remove the solvent and any solubilizers present.

The invention is illustrated in more detail by the examples below. The proportions of dicarboxylic acid components and diamine components have in each case been expressed relative to 100 mol-%. The intrinsic viscosities were determined as mentioned above.

EXAMPLE 1

Aromatic copolyamide of 100 mol-% of terephthaloyl chloride, 50 mol-% of 3,3'-dimethylbenzidine, 25 mol-% of 4,4'-diaminodiphenylmethane and 25 mol-% of p-phenylenediamine 42.4 g (0.2 mole) of 3,3'-dimethylbenzidine, 19.8 g (0.1 mole) of 4,4'-diaminodiphenylmethane, 10.8 g (0.1 mole) of p-phenylenediamine, 4.2 g of calcium chloride and 4.2 g of lithium chloride were dissolved under nitrogen in 1754 g of N-methylpyrrolidone, and between 12° C. and 67° C. 82.4 g (0.406 mole) of terephthaloyl chloride were added in the course of 65 minutes. The viscous solution was stirred at 68° C. for 40 minutes, was neutralized with 24.5 g of 96% pure calcium oxide and was stirred at 70° C. for a further 30 minutes.

The solution contained 6.5% of copolyamide, 2.5% of calcium chloride and 0.22% of lithium chloride. The dissolved polyamide had an intrinsic viscosity of 3.41.

The solution was filtered, degassed and subjected to wet spinning. To this end, it was spun through a nozzle having 50 holes each 0.1 mm in diameter at a speed of 8.2 m/min into a horizontal coagulation bath comprising a warm solution at 60° C. of 35% of N-methylpyrrolidone in water. The filaments obtained were passed through two water baths, a washer, over a dry godet and finally over a hot plate at a temperature of 367° C. at a speed of 79.5 m/min.

The individual filaments had a count of 1.58 dtex, a strength of 135 cN/tex, an elongation of 3.2% and an initial modulus of 5315 cN/tex, relative to 100% strain. In all examples the initial modulus was obtained from the stress-strain diagram and standardized to a strain of 100%.

COMPARATIVE EXAMPLE 1

Aromatic copolyamide of 100 mol-% of terephthaloyl chloride, 50 mol-% of 3,3'-dimethylbenzidine and 50 mol-% of p-phenylenediamine 42.4 g (0.2 mole) of 3,3'-dimethylbenzidine, 21.6 g (0.2 mole) of p-phenylenediamine, 4.2 g of calcium chloride and 4.2 g of lithium chloride were dissolved under nitrogen in 1625 g of N-methylpyrrolidone. 81.9 g (0.403 mole) of terephthaloyl chloride were added at between 12° C. and 60° C. in the course of 30 minutes. After 60 minutes of stirring the solution was neutralized with 24.5 g of 96% pure calcium oxide. The solution became heterogeneous and was not spinnable.

COMPARATIVE EXAMPLE 2

Aromatic copolyamide of 100 mol-% of terephthaloyl chloride, 50 mol-% of 4,4'-diaminophenylmethane and 50 mol-% of p-phenylenediamine 79.2 g (0.4 mole) of 4,4'-diaminodiphenylmethane and 43.2 g (0.4 mole) of p-phenylenediamine were dissolved in 3450 g of N-methylpyrrolidone. This was followed by reaction at temperatures rising from 19° C. to 70° C.

with 163.2 g (0.804 mole) of terephthaloyl chloride in the course of 100 minutes. Neutralization with 49.0 g of 96% pure calcium oxide was followed by stirring at 70°–80° C. for 140 minutes.

The solution contained 6.0% of polyamide and 2.36% of calcium chloride, the polyamide having an intrinsic viscosity of 3.25.

The filtered and degassed solution was spun through a 200hole nozzle having hole diameters of 0.09 mm each into a warm coagulation bath at 60° C. comprising a 35% strength solution of N-methylpyrrolidone in water.

Washing, drying and stretching on a hot plate at 430° C. by a factor of 6.34 produced filaments having a count of 1.13 dtex, a strength of 91 cN/tex, an elongation of 5.7% and an initial modulus of 1988 cN/tex, relative to 100% strain.

COMPARATIVE EXAMPLE 3

Aromatic copolyamide of 100 mol-% of terephthaloyl chloride, 43.75 mol-% of 4,4'-diaminodiphenylmethane and 56.25 mol-% of p-phenylenediamine The procedure described in Comparative Example 2, was used to react:

69.3 g (0.35 mole) of 4,4'-diaminodiphenylmethane, 48.6 g (0.45 mole) of p-phenylenediamine, 9.3 g of calcium chloride and 9.3 g of lithium chloride in 3723 g of N-methylpyrrolidone with 163.6 g (0.806 mole) of terephthaloyl chloride.

When the desired viscosity had been reached, the polycondensation was stopped by addition of 2.2 g of benzoyl chloride and was subsequently neutralized with 49.0 g of 96% pure calcium oxide.

This gave a solution which contains 5.5% of copolymer, 2.4% of calcium chloride and 0.23% of lithium chloride. The copolymer had an intrinsic viscosity of 2.90.

Spinning took place through a 50-hole nozzle having hole diameters of 0.1 mm into a 38% strength N-methylpyrrolidone solution at 60° C. This was followed by washing, drying and stretching at 418° C. by a factor of 5.4, producing filaments having a count of 1.62 dtex, a strength of 60 cN/tex, an elongation of 3.7% and an initial modulus of 2163 cN/tex.

EXAMPLE 2

Aromatic copolyamide of 100 mol-% of terephthaloyl chloride, 60 mol-% of 3,3'-dimethoxybenzidine, 20 mol-% of 4,4'-diaminodiphenylmethane and 20 mol-% of p-phenylenediamine 58.56 g (0.24 mole) of 3,3'-dimethoxybenzidine, 15.84 g (0.08 mole) of 4,4'-diaminodiphenylmethane, 8.65 g (0.08 mole) of p-phenylenediamine, 10.3 g of calcium chloride and 10.3 g of lithium chloride were dissolved under nitrogen in 2050 g of N-methylpyrrolidone.

82.0 g (0.404 mole) of terephthaloyl chloride were added at temperatures rising from 8° C. to 69° C. in the course of 90 min. The neutralization was effected with 24.5 g of 96% pure calcium oxide. The viscous solution was then stirred at 72° C. for 45 min.

The solution contained 6.0% of polyamide, 2.43% of calcium chloride and 0.46% of lithium chloride. The copolyamide had an intrinsic viscosity of 4.55.

The solution obtained was filtered and degassed and then spun by wet spinning through a 40-hole nozzle having hole diameters of 0.15 mm into a coagulation bath of 35% strength N-methylpyrrolidone at 60° C., and the filaments obtained were washed, dried and stretched on a hot plate at a temperature of 304° C. by a factor of 11. The filaments obtained had counts of 1.1 dtex, a strength of 103 cN/tex, an elongation of 2.8% and an initial modulus of 4785 cN/tex.

COMPARATIVE EXAMPLE 4

Aromatic copolyamide of 100 mol-% of terephthaloyl chloride, 50 mol-% of 3,3'-dimethoxybenzidine and 50 mol-% of p-phenylenediamine 48.8 g (0.2 mole) of 3,3'-dimethoxybenzidine, 21.6 g (0.2 mole) of p-phenylenediamine, 4.6 g of calcium chloride and 4.6 g of lithium chloride were dissolved in 1716 g of N-methylpyrrolidone in the absence of air.

80.2 g (0.395 mole) of terephthaloyl chloride were added between 12° C. and 71° C. in the course of 40 minutes. The extremely viscous solution was neutralized with 24.5 g of 96% pure calcium oxide. The solution was inhomogeneous and could not be spun.

COMPARATIVE EXAMPLE 5

Aromatic polyamide of 100 mol-% of 4,4'-diaminediphenylmethane and 100 mol-% of terephthaloyl chloride 79.2 g (0.4 mole) of 4,4'-diaminodiphenylmethane were dissolved in 2012 g of N-methylpyrrolidone. 82.1 g (0.404 mole) of terephthaloyl chloride were added between 8° C. and 70° C. in the course of 85 minutes, and the solution was then neutralized with 24.5 g of 96% pure calcium oxide and was filtered and degassed.

This gave a solution containing 6.0% of polyamide and 2.03% of calcium chloride. The intrinsic viscosity of the copolyamide was only 2.30. Spinning took place by wet spinning through a 50-hole nozzle having hole diameters of 0.1 mm into a coagulation bath of 35% strength N-methylpyrrolidone at 60° C. Washing and drying was followed by stretching over a hot plate at 420° C. by a factor of 2.1.

This gave filaments having counts of 3.24 dtex, a strength of only 9 cN/tex and an elongation of 2.2%.

COMPARATIVE EXAMPLE 6

Aromatic polyamide of 100 mol-% of terephthaloyl chloride and 100 mol-% of 3,3'-dimethylbenzidine 84.8 g (0.40 mole) of 3,3'-dimethylbenzidine were dissolved in 2099 g of N-methylpyrrolidone.

81.7 g (0.402 mole) of terephthaloyl chloride were added between 10° and 68° C. in the course of 65 minutes.

At an early stage of the addition of the acid chloride a colorless, insoluble and consequently unspinnable product was precipitated.

EXAMPLE 3

Aromatic copolyamide of 100 mol-% of terephthaloyl chloride, 50 mol-% of 3,3'-dimethoxybenzidine, 25 mol-% of 4,4'-diaminodiphenylmethane and 25 mol-% of p-phenylenediamine 48.8 g (0.2 mole) of 3,3'-dimethoxybenzidine, 19.8 g (0.1 mole) of 4,4'-diaminodiphenylmethane, 10.8 g (0.1 mole) of p-phenylenediamine, 4.6 g of calcium chloride and 4.6 g of lithium chloride were dissolved in 1846 g of N-methylpyrrolidone. 82.0 g (0.404 mole) of terephthaloyl chloride were metered in at between 11° C. and 70° C. in the course of 90 minutes. Neutralization was effected with 24.5 g of 96% pure calcium oxide, which was followed by stirring at 80° C. for 30 minutes.

The solution was filtered and degassed. It contained 6.5% of polymer, 2.4% of calcium chloride and 0.23% of lithium chloride. The copolyamide had an intrinsic viscosity of 3.95.

Wet spinning through a 50-hole nozzle having hole diameters of 0.1 mm each into a coagulation bath of 35% strength aqueous N-methylpyrrolidone at 60° C., washing, drying and stretching over a hot plate at 322° C. by a factor of 16.5 gave filaments having the following properties: count: 1.12 dtex; strength: 92 cN/tex; elongation 2.9%; initial modulus: 4321 cN/tex.

EXAMPLE 4

Aromatic copolyamide of 100 mol-% of terephthaloyl chloride, 25 mol-% of 3,3'-dichlorobenzidine, 25 mol-% of 4,4'-diaminodiphenylmethane and 15 mol-% of p-phenylenediamine 25.3 g (0.1 mole) of 3,3'-dichlorobenzidine, 19.8 g (0.1 mole) of 4,4'-diaminodiphenylmethane, 21.6 g (0.2 mole) of p-phenylenediamine, 9.0 g of calcium chloride and 9.0 g of lithium chloride were dissolved in 1797 g of N-methylpyrrolidone and were reacted at between 11° C. and 70° C. with 82.0 g (0.404 mole) of terephthaloyl chloride in the course of 90 minutes. This was followed by neutralization with 24.5 g of 96% pure calcium oxide and stirring for 30 minutes. The solution was filtered and degassed. It contained 6.0% of polymer, 2.7% of calcium chloride and 0.45% of lithium chloride. The copolyamide had an intrinsic viscosity of 3.11.

Spinning took place through a 50-hole nozzle having hole diameters of 0.1 mm each into an aqueous N-methylpyrrolidone coagulation bath (35%) at 40° C. and then through 4 wash baths, over a dry godet (180° C.) and finally over a hot plate at 342° C. to effect stretching by a factor of 3.7. The filaments had a count of 2.7 dtex, a strength of 67 cN/tex, an elongation of 2.7% and an initial modulus of 3552 cN/tex.

EXAMPLE 5

Aromatic copolyamide of 100 mol-% of terephthaloyl chloride, 50 mol-% of 3,3'-dimethylbenzidine, 25 mol-% of 4,4'-bis(4''-aminophenoxy)-diphenyl and 25 mol-% of p-phenylenediamine.

36.8 g (0.1 mole) of 4,4'-bis-(4''-aminophenoxy)-diphenyl, 42.4 g (0.2 mole) of 3,3'-dimethylbenzidine, 10.8 g (0.1 mole) of p-phenylenediamine, 5.5 g of calcium chloride and 5.5 g of lithium chloride were dissolved at 10° C. under inert gas in 2170 g of N-methylpyrrolidone.

82.2 g (0.405 mole) of terephthaloyl chloride were added at between 10° C. and 68° C. in the course of 90 minutes, which was followed by neutralization with 24.5 g of 96% pure calcium oxide, filtration and degassing. The solution contained 6.0% of polyamide, 2.1% of calcium chloride and 0.23% of lithium chloride. The copolymer had an intrinsic viscosity of 2.68.

The solution was spun through a nozzle having 50 holes of 0.1 mm each in diameter into a coagulation bath of 35% strength aqueous N-methylpyrrolidone at 40° C. The filaments were washed, dried and stretched over a hot plate at 280° C. by a factor of 5.1. Filament count: 2.08 dtex; strength 73 cN/tex; elongation 2.6%, initial modulus: 3931 cN/tex.

EXAMPLE 6

Aromatic copolyamide of 100 mol-% of terephthaloyl chloride, 50 mol-% of 3,3'-dimethylbenzidine, 25 mol-% of 1,4-bis(4'-aminophenoxy)-benzene and 25 mol-% of p-phenylenediamine 84.8 g (0.4 mole) of 3,3'-dimethylbenzidine, 58.4 g (0.2 mole) of 1,4-bis-(4'-aminophenoxy)-benzene and 21.6 g (0.2 mole) of p-phenylenediamine were dissolved in 3750 g of N-methylpyrrolidone. At 16° C. 162.4 g (0.8 mole) of terephthaloyl chloride were added as one portion and the temperature was raised to 61° C. in the course of 50 minutes. After reaching the desired viscosity, the solution was neutralized with 49.0 g of 96% pure calcium oxide.

This was followed by stirring at 70° C. for 80 minutes, filtration and degassing. The solution contained 6.5% of copolyamide and 2.16% of calcium chloride. The intrinsic viscosity of the polymer was 3.84.

The solution was spun using a so-called "dry nozzle wet spinning process". To this end, spinning took place through a spinning nozzle having 50 relatively widely spaced holes of 0.15 mm each in diameter, which was located at a distance of 38 mm above the coagulation bath, vertically downward. The coagulation bath had a temperature of 32° C. and comprised a solution of 23% of N-methylpyrrolidone in water. The spin speed was 26.5 m/min, the takeoff speed was 15.7 m/min, and the spin stretch ratio was 0.59. The filaments were passed through a plurality of washbaths and over two drying godets (180° C.) and were stretched over a hot plate at 390° C. by a factor of 14. This gave filaments having a count of 1.52 cN/tex, a strength of 177 cN/tex, an elongation of 2.8% and an initial modulus of 6808 cN/tex.

COMPARATIVE EXAMPLE 7

Aromatic polyamide of 100 mol-% of terephthaloyl chloride and 100 mol-% of 1,4-bis-(4'-aminophenoxy)-benzene (a) 89.84 g (0.308 mole) of 1,4-bis-(4'-aminophenoxy)-benzene were dissolved in 2000 g of N-methylpyrrolidone. At 18° C. 62.5 g (0.308 mole) of terephthaloyl chloride were added, and the temperature was raised. After 15 minutes and a material temperature of 54° C. the polymer precipitated. Spinning was not possible.

(b) 89.84 g (0.308 mole) of 1,4-bis-(4'-aminophenoxy)-benzene, 10.0 g of lithium chloride and 10.0 g of calcium chloride were dissolved in 2000 g of N-methylpyrrolidone. At 27° C. 62.5 g (0.308 mole) of terephthaloyl chloride were added, and the temperature was raised to 70° C. in the course of 40 minutes. At that temperature a further 1.25 g (0.006 mole) of terephthaloyl chloride were added, and stirring was continued for 15 minutes. This was followed by neutralization with 19.2 g of 96% pure calcium oxide.

The solution contained 5.95% of polyamide, 2.02% of calcium chloride and 0.46% of lithium chloride. The polymer viscosity was 2.11.

Spinning took place from a 200-hole nozzle having a hole diameter of 0.07 mm into a coagulation bath of 35% strength aqueous N-methylpyrrolidone at 40° C. Washing and drying was followed by stretching on a hot plate at 40° C. by a factor of 2.1. The filaments had a count of 1.13 dtex, a strength of only 19 cN/tex and an elongation of 3.1%.

EXAMPLE 7

Aromatic copolyamide of 100 mol-% of terephthaloyl chloride, 25 mol-% of 1,4-bis-(4'-aminophenoxy)-benzene, 50 mol-% of 3,3'-dimethoxybenzidine and 25 mol-% of p-phenylenediamine 97.6 g (0.4 mole) of 3,3'-dimethoxybenzidine, 58.4 g (0.2 mole) of 1,4-bis-(4'-aminophenoxy)-benzene and 21.6 g (0.2 mole) of p-phenylenediamine were dissolved under inert gas in 4054 g of N-methylpyrrolidone.

At 15° C. 157.5 g (0.776 mole) of terephthaloyl chloride were added. The temperature was raised to 71° C. while a further 5.2 g (0.026 mole) of terephthaloyl chloride were metered in. After the desired viscosity had been reached, the solution was neutralized with 49.0 g of 96% pure calcium oxide and stirred at 70° C. for a further 70 minutes and was then filtered and degassed. It contained 6.3% of polyamide and 2.0% of calcium chloride. The intrinsic viscosity of the polyamide was 4.73.

The solution was spun by wet spinning through a nozzle having 40 holes each of 0.1 mm in diameter. The coagulation bath used was a 20% strength aqueous solution of N-methylpyrrolidone at 60° C. The filaments were washed, dried and stretched over a hot plate at 320° C. by a factor of 10.5. The filaments had the following properties: count 1.13 dtex; strength: 140 cN/tex; elongation: 3.3%; initial modulus 5454 cN/tex.

EXAMPLE 8

Aromatic copolyamide of 100 mol-% of terephthaloyl chloride, 50 mol-% of 3,3'-dimethoxybenzidine, 31.25 mol-% of 1,4-bis-(4'-aminophenoxy)-benzene and 18.75 mol-% of p-phenylenediamine 97.6 g (0.4 mole) of 3,3'-dimethoxybenzidine, 73.0 g (0.25 mole) of 1,4-bis-(4'-aminophenoxy)-benzene, 16.2 g (0.15 mole) of p-phenylenediamine, 10.1 of calcium chloride and 10.1 g of lithium chloride were dissolved in 4054 g of N-methylpyrrolidone, and at 16° C. 155.9 g (0.768 mole) of terephthaloyl chloride were added. The temperature was raised to 67° C., and at that temperature a further 9.0 g (0.044 mole) of terephthaloyl chloride were metered in. After the desired viscosity had been achieved, the solution was neutralized with 49.0 g of 96% pure calcium oxide, and then filtered and degassed. The solution contained 6.5% of polymer, 2.2% of calcium chloride and 0.23% of lithium chloride. The copolyamide had an intrinsic viscosity of 2.42. The solution was spun by wet spinning through a nozzle having 200 holes each of 0.09 mm in diameter into a coagulation bath of 35% strength aqueous N-methylpyrrolidone at 60° C. The filaments were washed, dried and stretched on a hot plate at 330° C. by a factor of 11.2. The filaments had the following properties: count 0.55 dtex; strength 118 cN/tex; elongation 3.2%; initial modulus 4493 cN/tex.

COMPARATIVE EXAMPLE 8

Aromatic copolyamide of 100 mol-% of terephthaloyl chloride, 80 mol-% of 3,3'-dimethoxybenzidine, 10 mol-% of 1,4-bis-(4'-aminophenoxy)-benzene and 10 mol-% of p-phenylenediamine 78.1 g (0.32 mole) of 3,3'-dimethoxybenzidine, 11.7 (0.04 mole) of 1,4-bis-(4'-aminophenoxy)-benzene, 4.32 g (0.04 mole) of p-phenylenediamine and 10.5 g of lithium chloride were dissolved in 2099 g of N-methylpyrrolidone. 81.6 g (0.402 mole) of terephthaloyl chloride were added at temperatures between 10° C. and 70° C., followed by 24.5 g of 96% pure calcium oxide for neutralization. The solution was inhomogeneous and not spinnable.

COMPARATIVE EXAMPLE 9

Aromatic copolyamide of 100 mol-% of terephthaloyl chloride, 55 mol-% of 3,3'-dimethylbenzidine, 10 mol-% of 1,4-bis-(4'-aminophenoxy)-benzene and 35 mol-% of p-phenylenediamine 46.6 g (0.22 mole) of 3,3'-dimethylbenzidine, 11.7 g (0.04 mole) of 1,4-bis-(4'-aminophenoxy)-benzene, 15.1 g (0.14 mole) of p-phenylenediamine and 9.6 g of lithium chloride were dissolved in 1912 g of N-methylpyrrolidone. 81.8 g (0.403 mole) of terephthaloyl chloride were added at between 9° C. and 70° C. After reaching the desired viscosity, the polymerization was stopped by addition of 24.5 g of 96% pure calcium oxide.

The polymer solution was inhomogeneous and not spinnable. It proved possible to overcome these disadvantages by reducing the polymer concentration in the solution to 3–4%.

COMPARATIVE EXAMPLE 10

Aromatic copolyamide of 100 mol-% of terephthaloyl chloride, 50 mol-% of 3,3'-dimethoxybenzidine, 10 mol-% of 1,4-bis-(4'-aminophenoxy)-benzene and 40 mol-% of p-phenylenediamine 73.2 g (0.3 mole) of 3,3'-dimethoxybenzidine, 17.5 g (0.06 mole) of 1,4-bis-(4'-aminophenoxy)-benzene, 25.9 g (0.24 mole) of p-phenylenediamine and 14.9 g of lithium chloride were dissolved in 2966 g of N-methylpyrrolidone and reacted between 30° C. and 66° C. with 121.8 g (0.6 mole) of terephthaloyl chloride. Neutralization was effected with 38.5 g of 96% pure calcium oxide.

The very viscous polyamide solution was inhomogeneous and could not be spun. By contrast, solutions of the same copolyamide at a lower polymer concentration were still spinnable. Here too a reduction in the polymer concentration to values of for example below 4% was of advantage.

EXAMPLE 9

Aromatic copolyamide from 100 mol-% of terephthaloyl chloride, 62.5 mol-% of 3,3'-dimethylbenzidine, 12.5 mol-% of 1,4-bis-(4'-aminophenoxy)-benzene and 25 mol-% of p-phenylenediamine.

41.1 g of 3,3'-dimethylbenzidine, 11.3 g of 1,4-bis-(4'-aminophenoxy)benzene and 8.4 g of p-phenylenediamine were dissolved in 2387 g of N-methylpyrrolidone and reacted at between 10 and 70° C. with 62.9 g of terephthaloyl chloride. The resulting, very viscous polymer solution was neutralized with 19.0 g of 96% pure calcium oxide. It then contained 4.0% of copolyamide and 1.4% of calcium chloride in the solution. The intrinsic viscosity of the copolyamide was 5.54. The solution was filtered and degassed and was spun in a wet spinning process through a nozzle with 50 holes each 0.1 mm in diameter into a coagulation bath which comprised a 35% strength aqueous solution of N-methylpyrrolidone and was at 60° C. The filaments obtained were washed, dried and stretched over a hotplate at a maximum temperature of 385° C. by a factor of 4.14. Filaments having a count of 1.12 dtex, a strength of 136 cN/tex, an elongation at break of 2.1% and an initial modulus of 7450 cN/tex were obtained.

EXAMPLE 10

Aromatic polyamide from 100 mol-% of terephthaloyl chloride, 50 mol-% of 3,3'-dimethylbenzidine, 37.5 mol-% of p-phenylenediamine and 12.5 mol-% of 1,4-bis-(4'-aminophenoxy)benzene.

212 g (1.0 mol) of 3,3'-dimethylbenzidine, 81 g (0.75 mol) of p-phenylenediamine and 73 g (0.25 mol) of 1,4-bis-(4'-aminophenoxy)-benzene were dissolved in 14420 g of N-methylpyrrolidone and reacted at 16° C. with 404.8 g of terephthaloyl chloride. The reaction mixture was heated and reacted at 65° C. with a further 1.2 g of terephthaloyl chloride (total 2.0 mol). Stirring was continued at 70° C. for 120 minutes. The solution was then neutralized by addition of 122.7 g of 96% pure calcium oxide. The solution contained 4.1% of copolyamide and 1.45% of calcium chloride. The intrinsic viscosity of the polymer was 6.26.

The solution was filtered, degassed and spun in a so-called "dry nozzle wet spinning process" from a 200-hole nozzle with hole diameters of 0.09 mm. The spinning nozzle was situated in the gas space at a distance of 10 mm above a coagulation bath into which spinning took place vertically downward. The coagulation bath comprised a 35% strength aqueous solution of N-methylpyrrolidone at 60° C. The filaments obtained were washed, drid and stretched over a 4-part hotplate having surface temperatures of 340°350°, 360° and 390° C. by a factor of 6.1. The filaments obtained had the following properties: count 0.92 dtex, strength 201 cN/tex (in the twisted state), elongation at break 3.5% and an initial modulus of 7300 cN/tex.

The experiment was repeated using the same monomer composition, but the spinning solution contained 4.5% of polymer and 1.69% of calcium chloride. The intrinsic viscosity of the copolyamide was found to be 6.32. Spinning took place in the same way as described above, except that the hotplate temperatures were 370°, 370°, 380° and 385° C. The overall stretch was by a factor of 4.3. The filaments obtained had the following properties: count 1.34 dtex, strength 183 cN/tex (measured on a twisted multifilament yarn), elongation 3.5% and initial modulus 7400 cN/tex.

The originally described experiment was repeated, preparing a polymer solution of the same monomer composition which, however, contained 5.0% of polymer and 1.8% of calcium chloride in the spinning solution. The intrinsic viscosity of the copolyamide was 5.89. The solution obtained was as described above subject to a dry nozzle wet spinning process, hotplate temperatures were 340°, 350°, 360° and 390° C., and the stretch under these conditions was by 1:5.3. The filaments obtained had the following properties: oount 0.99 dtex, strength 197 cN/tex (twisted), elongation 3.3% and initial modulus 7700 cN/tex.

The same method was used to prepare a polymer solution of the same monomer composition which contained 5.5% of polymer and 2.0% of calcium chloride. The intrinsic viscosity of the copolyamide was found to be 5.49. This polymer solution was likewise spun using the spinning process described above at hotplate temperatures of 370°, 370°, 380° and 395° C. The stretching ratio was 1:6.5. The filaments had the following properties: count 1.21 dtex, strength 195 cN/tex (twisted), elongation 3.4% and initial modulus 7900 cN/tex.

COMPARATIVE EXAMPLE 11

Aromatic copolyamide of 100 mol-% of terephthaloyl chloride, 35 mol-% of 3,3'-dimethylbenzidine, 15 mol-% of 1,4-bis-(4'-aminophenoxy)-benzene and 50 mol-% of p-phenylenediamine 29.7 g (0.14 mole) of 3,3'-dimethylbenzidine, 17.5 g (0.06 mole) of 1,4-(4'-aminophenoxy)-benzene, 21.6 g (0.2 mole) of p-phenylenediamine and 9.2 g of lithium chloride were dissolved in 1839 g of N-methylpyrrolidone and reacted between 6° C. and 70° C. with 81.9 g (0.403 mole) of terephthaloyl chloride and then neutralized with 24.5 g of 96% pure calcium oxide.

The polymer solution was inhomogeneous and could not be spun.

As is evident from Example 11 below, it is possible to spin polymer solutions of similar composition provided the polymer concentration is reduced to 4% or less.

EXAMPLE 11

Aromatic copolyamide from 100 mol-% of terephthaloyl chloride, 37.5 mol-% of 3,3'-dimethylbenzidine, 12.5 mol-% of 1,4-bis-(4'-aminophenoxy)-benzene and 50 mol-% of p-phenylenediamine.

24.7 g of 3,3'-dimethylbenzidine, 11.3 g of 1,4-bis-(4'-aminophenoxy)-benzene and 16.8 g of p-phenylenediamine are dissolved in 2193 g of N-methylpyrrolidone. 62.9 g of terephthaloyl chloride were added between 10 and 70° C. The viscous solution was neutralized with 19.0% of 96% pure calcium oxide. The polymer solution obtained was then filtered and degassed. It contained 4% of copolyamide and 1.6% of calcium chloride. This solution was spun in a wet spinning process by means of a 50-hole nozzle having nozzle diameters of 0.1 mm into a warm coagulation bath at 60° C. of 35% strength aqueous N-methylpyrrolidone solution. The filaments obtained were washed, dried and stretched over a hotplate at a maximum of 385° C. by a factor of 4.6. The filaments had counts of 1.58 dtex, a strength of 112 cN/tex, elongation at break of 2.3% and an initial modulus of 6117 cN/tex.

COMPARATIVE EXAMPLE 12

Aromatic copolyamide from 100 mol-% of terephthaloyl chloride, 25 mol-% of 3,3'-dimethylbenzidine, 12.5 mol-% of 1,4-bis-(4'-aminophenoxy)-benzene and 62.5 mol-% of p-phenylenediamine.

16.5 g of 3,3'-dimethylbenzidine, 11.3 g of 1,4-bis-(4'-aminophenoxy) -benzene and 21,0 g of p-phenylenediamine were dissolved in 2096 g of N-methylpyrrolidone and were reacted between 10° and 70° C. with 62.9 g of terephthaloyl chloride. This was followed by stirring and subsequent neutralization with 19.0 g of 96% pure calcium oxide. The polymer solution as produced contained 4% of copolyamide and 1.6% of calcium chloride. The copolyamide had an intrinsic viscosity of 3.12. After filtration and degassing the solution was spun through a 50-hole nozzle (hole diameter 0.1 mm) at 60° C. into a coagulation bath of 35% of N-methylpyrrolidone and 65% of water. The filaments obtained were washed, dried and subsequently stretched over a hotplate at a maximum of 385° C. by a factor of 2.44. The filaments had the following properties: count 1.22 dtex, strength 46 cN/tex, elongation 1.5% and initial modulus of 4338 cN/tex. While the initial modulus of the filaments obtained can still be regarded as excellent, the value of the maximum tensile strength per tex, by contrast, was distinctly lower than that of the other samples.

EXAMPLE 12

Aromatic copolyamide of 100 mol-% of terephthaloyl chloride, 25 mol-% of 3,3'-dimethylbenzidine, 40 mol-% of 1,4-bis-(4'-aminophenoxy)-benzene and 35 mol-% of p-phenylenediamine 21.2 g (0.1 mole) of 3,3'-dimethylbenzidine, 46.7 g (0.16 mole) of 1,4-bis-(4'-aminophenoxy)-benzene, 15.1 g (0.14 mole) of p-phenylenediamine and 10.4 g of lithium chloride were dissolved in 2061 g of N-methylpyrrolidone. 81.8 g (0.403 mole) of terephthaloyl chloride were added between 10° C. and 70° C. The viscous solution was neutralized with 24.5 g of 96% pure calcium oxide and was then filtered and degassed. It contains 6.0% of polyamide, 2.0% of calcium chloride and 0.46% of lithium chloride. The intrinsic viscosity was 3.70.

The solution was spun by wet spinning through a nozzle having 50 holes each of 0.1 mm in diameter into a coagulation bath of 35% strength aqueous N-methylpyrrolidone solution at 60° C. After washing and drying the filaments were stretched over a hot plate at 380° C. by a factor of 9.2. The filaments had the following properties: count 1.70 dtex; strength 134 cN/tex and elongation of 3.4%.

EXAMPLE 13

Aromatic copolyamide of 100 mol-% terephthaloyl chloride, 45 mol-% of 1,4-bis-(4'-aminophenoxy)-benzene, 40 mol-% of 3,3'-dimethylbenzidine and 15 mol-% of p-phenylenediamine 33.9 g (0.16 mole) of 3,3'-dimethylbenzidine, 52.6 g (0.18 mole) of 1,4-bis-(4'-aminophenoxy)-benzene, 6.5 g (0.06 mole) of p-phenylenediamine and 11.1 g of lithium chloride were dissolved in 2217 g of N-methylpyrrolidone. 81.8 g (0.403 mole) of terephthaloyl chloride were added between 8° C. and 70° C. The viscous solution was neutralized with 24.5 g of 96% pure calcium oxide and then filtered and degassed.

It contained 6% of polyamide, 1.84% of calcium chloride and 0.46% of lithium chloride. The intrinsic viscosity of the polyamide was 3.72.

The solution was spun through a 50-hole nozzle having hole diameters of 0.1 mm into a 35% strength aqueous N-methylpyrrolidone coagulation bath at 60° C. The filaments were washed, dried and stretched on a hot plate at 400° C. by a factor of 8.4. The filaments had the following properties: count 1.92 dtex; strength 138 cN/tex; elongation: 3.2%.

EXAMPLE 14

Aromatic copolyamide of 100 mol-% of terephthaloyl chloride, 40 mol-% of 1,4-bis-(4'-aminophenoxy)-benzene, 10 mol-% of p-phenylenediamine and 50 mol-% of 3,3-dimethoxybenzidine 73.2 g (0.3 mole) of 3,3'-dimethoxybenzidine, 70.1 g (0.24 mole) of 1,4-bis-(4'-aminophenoxy)-benzene, 6.5 g (0.06 mole) of p-phenylenediamine and 18.2 g of lithium chloride were dissolved in 3613 g of N-methylpyrrolidone. 122.8 g (0.605 mole) of terephthaloyl chloride were metered in at between 33° C. and 65° C., which was followed by neutralization with 38.5 g of 96% pure calcium oxide, filtration and degassing.

The solution contained 6.0% of polyamide, 1.69% of calcium chloride and 0.46% of lithium chloride. The intrinsic viscosity of the polymer was 4.21.

Spinning took place through a 50-hole nozzle having hole diameters of 0.1 mm each into a coagulation bath of 35% strength aqueous N-methylpyrrolidone at 60° C. The filaments were washed, dried and stretched on a hot plate at 380° C. by a factor of 13.5. The filaments then had a count of 1.38 dtex; a strength of 129 cN/tex and an elongation of 3.3%.

EXAMPLE 15

Aromatic copolyamide of 100 mol-% of terephthaloyl chloride, 60 mol-% of 3,3'-dimethylbenzidine, 30 mol-% of 1,4-bis-(4'-aminophenoxy)-benzene and 10 mol-% of p-phenylenediamine 50.9 g (0.24 mole) of 3,3'-dimethylbenzidine, 35.0 g (0.12 mole) of 1,4-bis-(4'-aminophenoxy)-benzene, 4.32 g (0.04 mole) of p-phenylenediamine and 10.8 of lithium chloride were dissolved in 2173 g of N-methylpyrrolidone. 81.8 g (0.403 mole) of terephthaloyl chloride were added between 10° C. and 68° C., which was followed by neutralization with 24.5 g of 96% pure calcium oxide, filtration and degassing.

The solution contained 6.0% of polyamide, 1.87% of calcium chloride, 0.45% of lithium chloride. The intrinsic viscosity was 3.87.

Spinning was effected by wet spinning through a 50-hole nozzle having hole diameters of 0.1 mm each into a coagulation bath of 35% strength aqueous N-methylpyrrolidone at 60° C., and the filaments were then washed, dried and stretched on a hot plate at 380° C. by a factor of 4.9. The filaments had a count of 1.56 dtex, a strength of 108 cN/tex and an elongation of 2.2%.

COMPARATIVE EXAMPLE 13

Aromatic copolyamide of 100 mol-% of terephthaloyl chloride, 10 mol-% of 3,3'-dimethylbenzidine, 40 mol-% of 1,4-bis(4'-aminophenoxy)-benzene and 50 mol-% of p-phenylenediamine 8.5 g (0.04 mole) of 3,3'-dimethylbenzidine, 46.7 g (0.16 mole) of 1,4-bis-(4'-aminophenoxy)-benzene, 21.6 g (0.2 mole) of p-phenylenediamine and 11.5 g of lithium chloride were dissolved in 2283 g of N-methylpyrrolidone. 82.0 g (0.404 mole) of terephthaloyl chloride were added between 10° C. and 69° C. in the course of 75 minutes. The solution was neutralized with 24.5 g of 96% pure calcium oxide and then filtered and degassed. The solution contained 6.0% of polymer, 1.78% of calcium chloride and 0.46% of lithium chloride. The intrinsic viscosity of the polymer was 3.45.

Spinning was effected through a 50-hole nozzle having hole diameters of 0.1 mm each into a coagulation bath of 35% strength aqueous N-methylpyrrolidone at 60° C. The filaments were washed, dried and stretched over a hot plate at 430° C. by a factor of 6.2. The filaments had the following properties: count 1.52 dtex; strength 95 cN/tex; elongation 3.3%.

EXAMPLE 16

Aromatic copolyamide of 100 mol-% of terephthaloyl chloride, 20 mol-% of 1,4-bis-(4'-aminophenoxy)-benzene, 30 mol-% of p-phenylenediamine and 50 mol-% of 3,3'-dimethoxybenzidine 35.0 g (0.12 mole) of 1,4-bis-(4'-aminophenoxy)-benzene, 73.2 g (0.3 mole) of 3,3'-dimethoxybenzidine, 19.4 g (0.18 mole) of p-phenylenediamine and 15.5 g of lithium chloride were dissolved in 3139 g of N-methylpyrrolidone. 123.8 g (0.61 mole) of terephthaloyl chloride were metered in at between 25° C. and 68° C. The solution was neutralized with 38.5 g of 96% pure calcium oxide and then filtered and degassed.

The solution contained 6.0% of polymer, 1.94% of calcium chloride and 0.45% of lithium chloride. The intrinsic viscosity of the copolymer was 3.84.

Spinning was effected through a 50-hole nozzle having hole diameters of 0.1 mm each into a coagulation bath of 35% strength aqueous N-methylpyrrolidone at 60° C. After washing and drying, the filaments were stretched on a hot plate at 340° C. by a factor of 9.5. The filaments had a count of 1.22 dtex, a strength of 119 cN/tex and an elongation of 2.8%.

EXAMPLE 17

Aromatic copolyamide of 100 mol-% of terephthaloyl chloride, 37.5 mol-% of 3,3'-dimethylbenzidine, 37.5 mol-% of p-phenylenediamine and 25 mol-% of 1,4-bis-(4'-amino-phenoxy)-benzene 31.8 g (0.15 mole) of 3,3'-dimethylbenzidine, 29.2 g (0.1 mole) of 1,4-bis-(4'-aminophenoxy)-benzene, 16.2 g (0.15 mole) of p-phenylenediamine and 9.9 g of lithium chloride were dissolved in 1968 g of N-methylpyrrolidone. 82.3 g (0.405 mole) of terephthaloyl chloride were metered in at between 9° C. and 70° C. After neutralization with 24.5 g of 96% pure calcium oxide the solution was filtered and degassed.

The solution contained 6.0% of polyamide, 2.06% of calcium chloride and 0.46% of lithium chloride. The polymer viscosity was 3.12.

Spinning was effected through a 50-hole nozzle having hole diameters of 0.1 mm each into a coagulation bath of aqueous N-methylpyrrolidone (35%) at 60° C. The filaments were washed, dried and stretched on a hot plate at 350° C. by a factor of 6.7. The properties were as follows: count 1.5 dtex; strength 118 cN/tex; elongation 2.9%.

What is claimed is:

1. A shaped aromatic dicarboxylic acid/diamine copolyamide fibrous or film-like or sheet-like article wherein the shape-forming copolyamide comprises a polymer having at least the recurring structural units of the formulae:

A—OC—Ar—CO— as well as
B—NH—Ar'—NH—

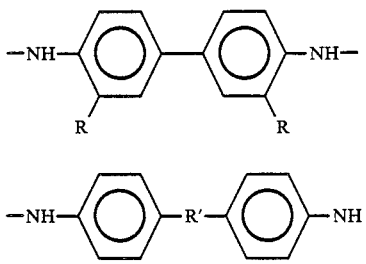

where
Ar— and —Ar'— denote divalent aromatic radicals in which the valence bonds are in para- or comparable coaxial or parallel position, provided that —NH—Ar'—NH— is not the same as formulae C or D,
R denotes a lower alkyl radical or a lower alkoxy radical each having up to 4 carbon atoms or denotes a halogen radical and
R'— denotes an unsubstituted or substituted methylene radical or a grouping —O—Ar—O— where —Ar— has the same structure as specified above, and the proportions of the diamine components B, C and D relative to the total amount of diamine components in mol-% are within an area which is defined by the following corner points:
point Q corresponds to 5 mol-% of B, 45 mol-% of C, 50 mol-% of D;
point R corresponds to 45 mol-% of B, 5 mol-% of C, 50 mol-% of D;
point S corresponds to 60 mol-% of B, 35 mol-% of C, 5 mol-% of D;
point T corresponds to 20 mol-% of B, 75 mol-% of C, 5 mol-% of D;
point U corresponds to 5 mol-% of B, 80 mol-% of C, 15 mol-% of D;

and the copolyamide has an intrinsic viscosity of about 2.4 to 6.5 ml/g (measured on solutions of 0.5 g of polyamide in 100 ml of 98% by weight strength H$_2$SO$_4$ at 25° C.).

2. The shaped structure as claimed in claim 1, wherein the proportions of the diamine components B, C and D relative to the total amount of diamine components in mol-% are within an area which is defined by the following corner points:
point Q' corresponds to 15 mol-% of B, 45 mol-% of C, 40 mol-% of D;
point R' corresponds to 40 mol-% of B, 20 mol-% of C, 40 mol-% of D;
point S' corresponds to 50 mol-% of B, 40 mol-% of C, 10 mol-% of D;
point T' corresponds to 15 mol-% of B, 75 mol-% of C, 10 mol-% of D.

3. The shaped structure as claimed in claim 1, wherein —Ar—and—Ar'—each denotes a 1,4-phenylene radical.

4. The shaped structure as claimed in claim 2, wherein —Ar—and—Ar'—each denotes a 1,4-phenylene radical.

5. The shaped structure as claimed in claim 1, wherein —R denotes —CH$_3$, —OCH$_3$ or —Cl.

6. The shaped structure as claimed in claim 2, wherein —R denotes —CH$_3$, —OCH$_3$ or —Cl.

7. The shaped structure as claimed in claim 1, wherein —R'—denotes—

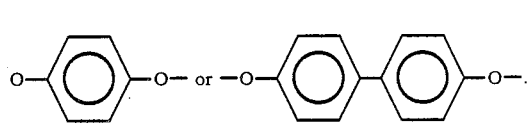

8. The shaped structure as claimed in claim 2, wherein —R'—dentoes

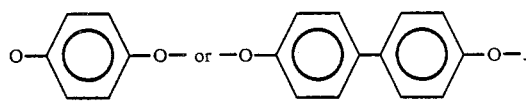

9. The shaped structure as claimed in claim 1, wherein —Ar—and—Ar'—each denotes 1,4-phenylene radical, R each denote —CH$_3$, —OCH$_3$ or —Cl and —R'— each denote

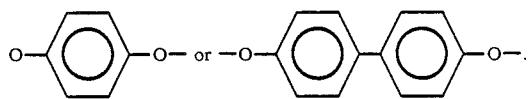

10. The shaped structure as claimed in claim 2, wherein —Ar—and—Ar'—each denotes 1,4-phenylene radical, R each denotes —CH$_3$, —OCH$_3$ or —Cl and —R'— each denote

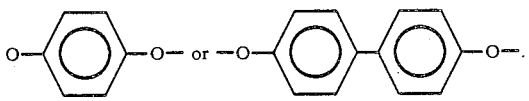 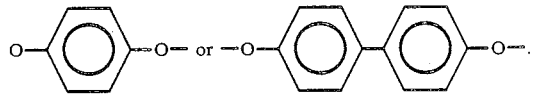

11. The shaped structure as claimed in claim 1, wherein the proportions of the diamine components B, C and D relative to the total amount of diamine components in mol-% are within an area which is defined by the following corner points:

point W corresponds to 5 mol-% of B, 45 mol-% of C, 50 mol-% of D;
point X corresponds to 45 mol-% of B, 5 mol-% of C, 50 mol-% of D;
point Y corresponds to 45 mol-% of B, 40 mol-% of C, 15 mol-% of D;
point Z corresponds to 5 mol-% of B, 80 mol-% of C, 15 mol-% of D and the copolyamide has an intrinsic viscosity of about 2.4 to 5.0 ml/g (measured on solutions of 0.5 g of polyamide in 100 ml of 98% by weight strength $H_2SO_4$ at 25° C.).

12. The shaped structure as claimed in claim 11, wherein the proportions of the diamine components B, C and D relative to the total amount of diamine components in mol-% are within an area which is defined by the following corner points:

point W' corresponds to 15 mol-% of B, 50 mol-% of C, 35 mol-% of D;
point X' corresponds to 45 mol-% of B, 20 mol-% of C, 35 mol-% of D;
point Y' corresponds to 45 mol-% of B, 40 mol-% of C, 15 mol-% of D;
point Z' corresponds to 15 mol-% of B, 70 mol-% of C, 15 mol-% of D.

13. The shaped structure as claimed in claim 11, wherein —Ar— and —Ar'— each denotes a 1,4-phenylene radical.

14. The shaped structure as claimed in claim 12, wherein —Ar and —Ar'— each denotes a 1,4-phenylene radical.

15. The shaped structure as claimed in claim 11, wherein —R denotes —$CH_3$, —$OCH_3$ or —Cl.

16. The shaped structure as claimed in claim 12, wherein —R denotes —$CH_3$, —$OCH_3$ or —Cl.

17. The shaped structure as claimed in claim 11, wherein —R'—denotes

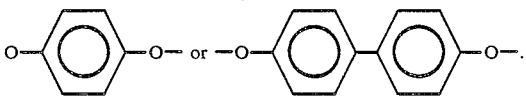

18. The shaped structure as claimed in claim 12, wherein —R'—denotes

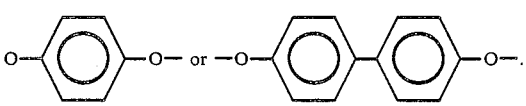

19. The shaped structure as claimed in claim 11, wherein —Ar— and —Ar'— each denotes 1,4-phenylene radical, R each denote —$CH_3$, $OCH_3$ or —Cl and —R'—each denotes 20. The shaped structure as claimed in claim 12, wherein —Ar— and —Ar'— each denotes 1,4-phenylene radical, R each denotes —$CH_3$, —$OCH_3$ or —Cl and —R'—each denote

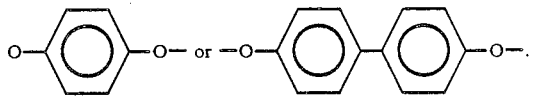

21. In a process for preparing a shaped article from an aromatic copolyamide by reacting at least one aromatic dicarbonyl dichloride with at least a substantially equimolar amount of a mixture of aromatic diamines in an aprotic solvent in the presence or absence of a metal halide of group 1 or 2 of the periodic table as a solubilizer, neutralizing the resultant HCl by addition of a substance acting as a base and subsequently shaping the resultant polymer solution into a filament, fiber, fiber pulp, film or sheet, the improvement which comprises: said aromatic carbonyl chloride is a compound of the formula

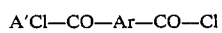

and said mixture of aromatic diamines comprises diamines of the formulae:

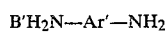

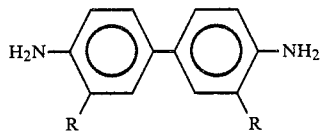

and

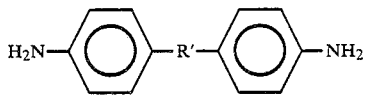

where
Ar— and —Ar'—denote divalent aromatic radicals in which the valence bonds are in para- or comparable coaxial or parallel position, provided that $NH_2$—Ar'—$NH_2$ is not the same as formulae C' or D',
R denotes a lower alkyl radical or a lower alkoxy radical each having up to 4 carbon atoms or denotes a halogen radical and
R'—denotes an unsubstituted or substituted methylene radical or a grouping —O—Ar—O— where—Ar—has the same structure as specified above, and the proportions of the diamine components B, C and D relative to the total amount of diamine components in mol-% are within an area which is defined by the following corner points:

point Q corresponds to 5 mol-% of B', 45 mol-% of C', 50 mol-% of D';

point R corresponds to 45 mol-% of B', 5 mol-% of C', 50 mol-% of D';

point S corresponds to 60 mol-% of B', 35 mol-% of C', 5 mol-% of D';

point T corresponds to 20 mol-% of B', 75 mol-% of C', 5 mol-% of D';

point U corresponds to 5 mol-% of B', 80 mol-% of C', 15 mol-% of D';

and continuing the polycondensation until the resultant copolyamide has an intrinsic viscosity of about 2.4 to 6.5 ml/g (measured on sultions of 0.5 g of polyamide in 100 ml of 98% by weight strength sulfuric acid at 25° C.).

22. The process as claimed in claim 21, wherein the molar fractions of iamines B', C' and D' relative to the total number of moles of the diamines are within an area which is defined by the following corner points:

point Q' corresponds to 15 mol-% of B', 45 mol-% of C', 40 mol-% of D';

point R' corresponds to 40 mol-% of B', 20 mol-% of C', 40 mol-% of D';

point S' corresponds to 50 mol-% of B', 40 mol-% of C', 10 mol-% of D';

point T' corresponds to 15 mol-% of B', 75 mol-% of C', 10 mol-% of D'.

23. The process as claimed in claim 21, wherein the molar fractions of the diamines B', C' and D' relative to the total number of moles of the diamines are within an area which is defined by the following corner points:

point W corresponds to 5 mol-% of B', 45 mol-% of C', 50 mol-% of D';

point X corresponds to 45 mol-% of B', 5 mol-% of C', 50 mol-% of D';

point Y corresponds to 45 mol-% of B', 40 mol-% of C', 15 mol-% of D';

point Z corresponds to 5 mol-% of B', 80 mol-% of C', 15 mol-% of D' and the polycondensation is continued until the copolyamide produced has an intrinsic viscosity of about 2.4 to 5.0 ml/g (measured on solutions of 0.5 g of polyamide in 100 ml of 98% by weight strength sulfuric acid at 25° C.).

24. The process as claimed in claim 23, wherein the mole fractions of the diamines B', C' and D' relative to the total number of moles of the diamines are within an area which is defined by the following corner points:

point W' corresponds to 15 mol-% of B', 50 mol-% of C', 35 mol-% of D';

point X' corresponds to 45 mol-% of B', 20 mol-% of C', 35 mol-% of D';

point Y corresponds to 45 mol-% of B', 40 mol-% of C', 15 mol-% of D';

point Z' corresponds to 15 mol-% of B', 70 mol-% of C', 15 mol-% of D'.

* * * * *